United States Patent
Lee et al.

(10) Patent No.: US 8,837,916 B2
(45) Date of Patent: Sep. 16, 2014

(54) APPARATUS AND METHOD TO PROVIDE ADAPTIVE RECORDING

(75) Inventors: Jae-cheol Lee, Hwaseong-si (KR); Hee-soo Lee, Suwon-si (KR); Byung-soo Kim, Seoul (KR); Yong-jun Park, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1358 days.

(21) Appl. No.: 12/038,100

(22) Filed: Feb. 27, 2008

(65) Prior Publication Data

US 2009/0041421 A1  Feb. 12, 2009

(30) Foreign Application Priority Data

Aug. 7, 2007  (KR) .................. 10-2007-0079142

(51) Int. Cl.
- *H04N 5/76* (2006.01)
- *H04N 5/91* (2006.01)
- *H04N 9/804* (2006.01)
- *H04N 9/82* (2006.01)

(52) U.S. Cl.
CPC .............. *H04N 5/91* (2013.01); *H04N 9/8042* (2013.01); *H04N 5/76* (2013.01); *H04N 9/8205* (2013.01)
USPC .......................................... 386/295; 386/291

(58) Field of Classification Search
CPC ......... H04N 5/76; H04N 5/91; H04N 9/8205; H04N 9/8042
USPC .................................................. 386/291–299
See application file for complete search history.

(56) References Cited

U.S. PATENT DOCUMENTS

| | | | | |
|---|---|---|---|---|
| 5,899,579 A | * | 5/1999 | Park | 386/253 |
| 6,137,834 A | * | 10/2000 | Wine et al. | 375/240 |
| 7,024,100 B1 | * | 4/2006 | Furuyama | 386/253 |
| 2003/0118243 A1 | * | 6/2003 | Sezer et al. | 382/245 |
| 2004/0221311 A1 | * | 11/2004 | Dow et al. | 725/52 |
| 2007/0033616 A1 | * | 2/2007 | Gutta | 725/58 |
| 2008/0313402 A1 | * | 12/2008 | Wong et al. | 711/118 |
| 2009/0074375 A1 | * | 3/2009 | Ramasubramaniam et al. | 386/52 |

FOREIGN PATENT DOCUMENTS

| | | |
|---|---|---|
| KR | 162316 | 8/1998 |
| KR | 10-2006-0038458 | 5/2006 |
| WO | 2005/011269 | 2/2005 |

OTHER PUBLICATIONS

Korean Office Action issued in Application No. 10-2007-0079142 on Aug. 29, 2013.

\* cited by examiner

*Primary Examiner* — Philip Chea
*Assistant Examiner* — Kendall Dolly
(74) *Attorney, Agent, or Firm* — Stanzione & Kim, LLP

(57) ABSTRACT

An apparatus and a method to provide adaptive recording, in which a group of pictures (GOP) is selectively recorded in a multi-media apparatus having a recording function. The recording method includes decoding content data and analyzing the content data in GOPs of the content data, and selectively storing an analyzed GOP according to recording settings.

18 Claims, 6 Drawing Sheets

APPARATUS AND METHOD TO PROVIDE ADAPTIVE RECORDING

CROSS-REFERENCE TO RELATED APPLICATIONS

This application claims the benefit of the priority of Korean Patent Application No. 10-2007-0079142, filed on Aug. 7, 2007, in the Korean Intellectual Property Office, the disclosure of which is incorporated herein in its entirety by reference.

BACKGROUND OF THE INVENTION

1. Field of the Invention

The present general inventive concept relates to a content recording system such as a multi-media apparatus or a personal video recorder (PVR), and more particularly, to a method and apparatus to provider adaptive recording, in which a group of pictures (GOP) is selectively stored in a multi-media apparatus having a recording function.

2. Description of the Related Art

Since digital technologies have been developed, various multi-media apparatuses (e.g., digital televisions (DTVs), computers, cellular phones, MP3 players or portable multi-media players (PMPs)) have become widely popular. As television (TV) broadcast has been digitized, broadcast related equipment has been rapidly digitized, and thus a personal video recorder (PVR) has been developed. Such multi-media apparatuses or PVRs can record media content, which is transmitted from other apparatuses through a communication network, in an inner storage medium. Accordingly, a multi-media apparatus can extract the recorded content and reproduce the recorded content if necessary.

A conventional multi-media apparatus cannot store content if a storage space is insufficient during recording of the content. That is, when the storage space is insufficient, the conventional multi-media apparatus cannot store content of a desired time period while additional storage capacity is added. In addition, the conventional multi-media apparatus should store content at low resolution in order to increase storage capacity. The conventional multi-media apparatus should have an additional encoder installed therein in order to store content at low resolution. Accordingly, the conventional multi-media apparatus converts a signal, which is decoded by a decoder in order to increase storage capacity, into content having a low resolution by using the encoder, and stores the converted content in a storage medium.

However, the price of a multi-media apparatus is increased due to the installation of an encoder. In addition, it is not easy to newly encode content since a content provider does not want a data source of the content to be damaged in order to protect the copyright of the content. In addition, since the encoder of the multi-media apparatus is complicated, it is not easy to encode content in real-time.

SUMMARY OF THE INVENTION

The present general inventive concept provides a method and apparatus to provide adaptive recording, in which information can be stored in a low capacity storage space without an additional encoder by selectively storing groups of pictures (GOPs).

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a recording method including decoding content data and analyzing the content data in groups of pictures (GOPs), and selectively storing an analyzed group of pictures (GOP) according to at least one recording setting.

The storing the analyzed GOP may include selecting a recording rate and a recording type as recording settings; determining whether the analyzed GOP of the content data is to be skipped according to the selected recording rate and recording type, adjusting information regarding a decoding time of the content data according to whether the GOP is to be skipped, and storing the adjusted decoding time information of the GOP.

The recording rate may be an interval corresponding to an extent to which a GOP is to be skipped.

The recording type may be fixed mode recording or variable mode recording.

The GOPs may be skipped at predetermined intervals when a GOP is recorded in a fixed mode.

GOPs of a present time which is remote from a recording time may be skipped first when a GOP is recorded in a variable mode.

Adjusting the information regarding a decoding time may include amending DTS/PTS information which has changed due to a rearrangement of the GOPs.

Previous GOPs may be skipped first when a GOP is recorded in a variable mode.

The foregoing and/or other aspects and utilities of the present general inventive concept may also be achieved by providing a recording method including decoding media content data and analyzing the media content data in groups of pictures (GOPs) of the content data, and variably or consistently storing an analyzed group of pictures (GOP) according to a recording setting.

Decoding the media content data may include selecting a recording time and an interval corresponding to an extent to which a GOP is to be skipped, determining whether the GOP is to be skipped according to the selected recording time and the interval corresponding to an extent to which the GOP is to be skipped, adjusting information regarding a decoding time of the media content data according to whether the GOP is to be skipped, and storing the adjusted media content data of the GOP.

The GOPs may be skipped at predetermined intervals when a GOP is consistently stored.

GOPs of a present time that is remote from a storing time may be skipped first when a GOP is variably stored.

Previous GOPs may be skipped first when a GOP is variably stored.

The foregoing and/or other aspects and utilities of the present general inventive concept may also be achieved by providing a recording apparatus including a decoder unit to decode input data and to analyze the input data in groups of pictures (GOPs) of the input data, a controlling unit to generate a control signal including control information associated with recording settings which corresponds to a rate type and an interval corresponding to an extent to which a group of pictures (GOP) is to be skipped, a recording signal processing unit to selectively skip a GOP analyzed in the decoder unit according to the recording settings which are set by the controlling unit, and a storage unit to store GOPs that are skipped in the recording signal processing unit and not recorded.

The recording signal processing unit may include a GOP detecting unit to detect a GOP start point and end point, which is analyzed in the decoder unit, a GOP skip unit to determine whether a GOP detected by the GOP detecting unit is to be skipped, according to the recording settings, and a synchronization-time adjusting unit to amend information regarding a recording time changed due to a rearrangement of GOPs which is performed by the GOP skip unit.

The GOP skip unit may include a fixed mode in which GOPs are skipped at predetermined intervals.

The GOP skip unit may include a variable mode in which GOPs are variably skipped.

The variable mode may be classified into a recording time based mode in which GOPs of a present time are skipped first, and a present time based mode in which previous GOPs are skipped first.

The foregoing and/or other aspects and utilities of the present general inventive concept may also be achieved by providing a computer readable recording medium having encoded thereon computer instructions that when executed by a computer perform a method of recording digital media content, including decoding content data and analyzing the content data in groups of pictures (GOPs) embedded in the content data, and selectively storing an analyzed group of pictures (GOP) according to a recording setting.

The foregoing and/or other aspects and utilities of the present general inventive concept may also be achieved by providing a method of recording digital media content, including receiving and demodulating a digital media content signal, and selectively storing packets of media data for recording which are embedded within the received and demodulated digital media content signal according to at least one of a recording rate and a recording type associated with the digital media content signal.

The recording type may be a fixed type and packets of media data may be skipped and not recorded corresponding to a predetermined interval.

The recording type may be a variable type and packets of media data corresponding to a first time may be skipped and not recorded and packets of media data corresponding to a second time are not skipped and are recorded.

The recording rate may be an interval to indicate whether packets of media data of the digital media signal are to be skipped or recorded.

BRIEF DESCRIPTION OF THE DRAWINGS

These and/or other aspects and utilities of the present general inventive concept will become more apparent by describing in detail exemplary embodiments, taken in conjunction with the accompanying drawings of which.

DETAILED DESCRIPTION OF THE PREFERRED EMBODIMENTS

Figure 1:
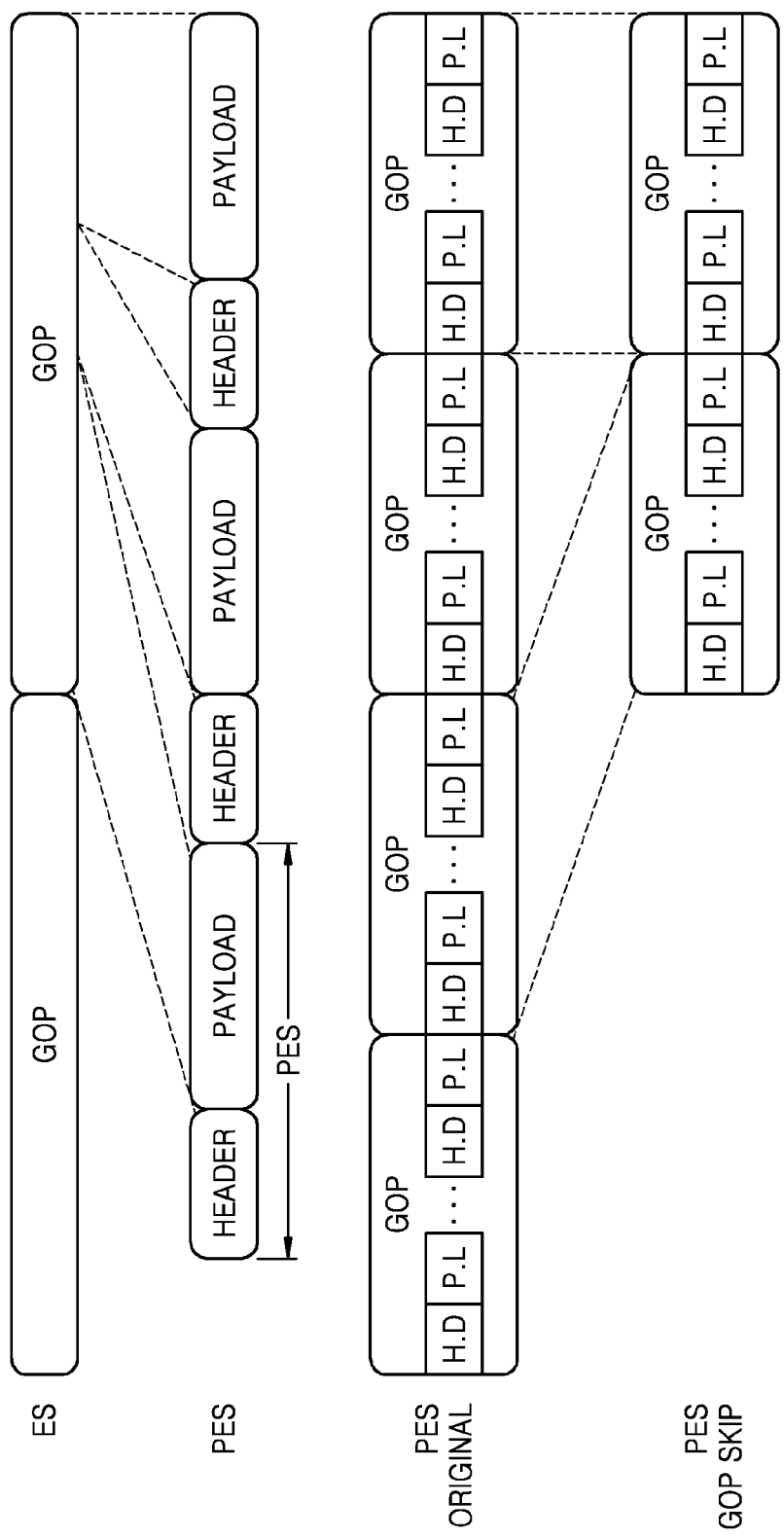
FIG. 1 is a structure view of a group of pictures (GOP) according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a structure view of a group of pictures (GOP) according to an embodiment of the present general inventive concept.

An MPEG system provides syntax of an MPEG audio stream and an MPEG video stream. An MPEG system is classified into a program stream (PS) type and a transport stream (TS) type. A PS can constitute one program, and a TS can constitute a plurality of programs.

In the MPEG system, multiplexing is performed based on packets. That is, in the MPEG system, a video/audio elementary stream (ES) is divided into bit strings in packet dimensions, and is attached with additional information (e.g., a header or the like) to be multiplexed. In this example, the header includes information to distinguish between a video packet and an audio packet. In the MPEG system, the length of a packet is set to be $2^{16}$ (64 KB) in order to meet various applications and standards, and packets can have a fixed length or a variable length in order to have flexibility. Information regarding the length of the packet is included in the header.

In the PS type, a plurality of packets (each referred to as a packetized elementary stream (PES) in MPEG-2) are classified to constitute a pack. In the TS type, a PES is reclassified to constitute a plurality of TS packets each having a relatively short length. In this example, the length of each TS packet is 188 bytes and the TS is divided into four asynchronous transfer mode (ATM) cells to be transmitted.

In addition, pictures for the MPEG system are classified into an intra-picture (I-picture), a predictive picture (P-picture) and a bidirectional picture (B-picture) according to a coding type. The I-picture makes a prediction of only a picture itself without any prediction between pictures. The P-picture makes a forward predication between pictures to encode differences between predictions. The B-picture makes both forward and backward predictions between pictures to encode differences between predictions.

A group of pictures (GOP) is composed of a group of directions of prediction and pictures according to the coding type.

For example, the GOP includes N pictures, where N is a whole number, and is configured in a structure in which two B-pictures are disposed between the I-picture and the P-picture. Each GOP can be independently decoded in a signal reproducing apparatus.

Referring to FIG. 1, an elementary stream ES includes a plurality of GOPs.

A PES packet includes a header and a payload. The length of the PES is variable. GOP information is stored in the payload in terms of pictures. Accordingly, the PES can be classified in terms of GOPs. Information regarding the length of the PES packet is included in the header. In addition, the header includes information regarding a GOP start and end point, a decoding time stamp (DTS), and a presentation time stamp (PTS).

A decoder can independently decode each GOP. Accordingly, the decoder can extract the GOP from the PES in GOP dimensions. A recording apparatus according to the present general inventive concept can extract a desired GOP according to recording settings.

The recording apparatus may amend DTS/PTS information included in the header of the PES for a GOP that is not extracted.

Figure 2:
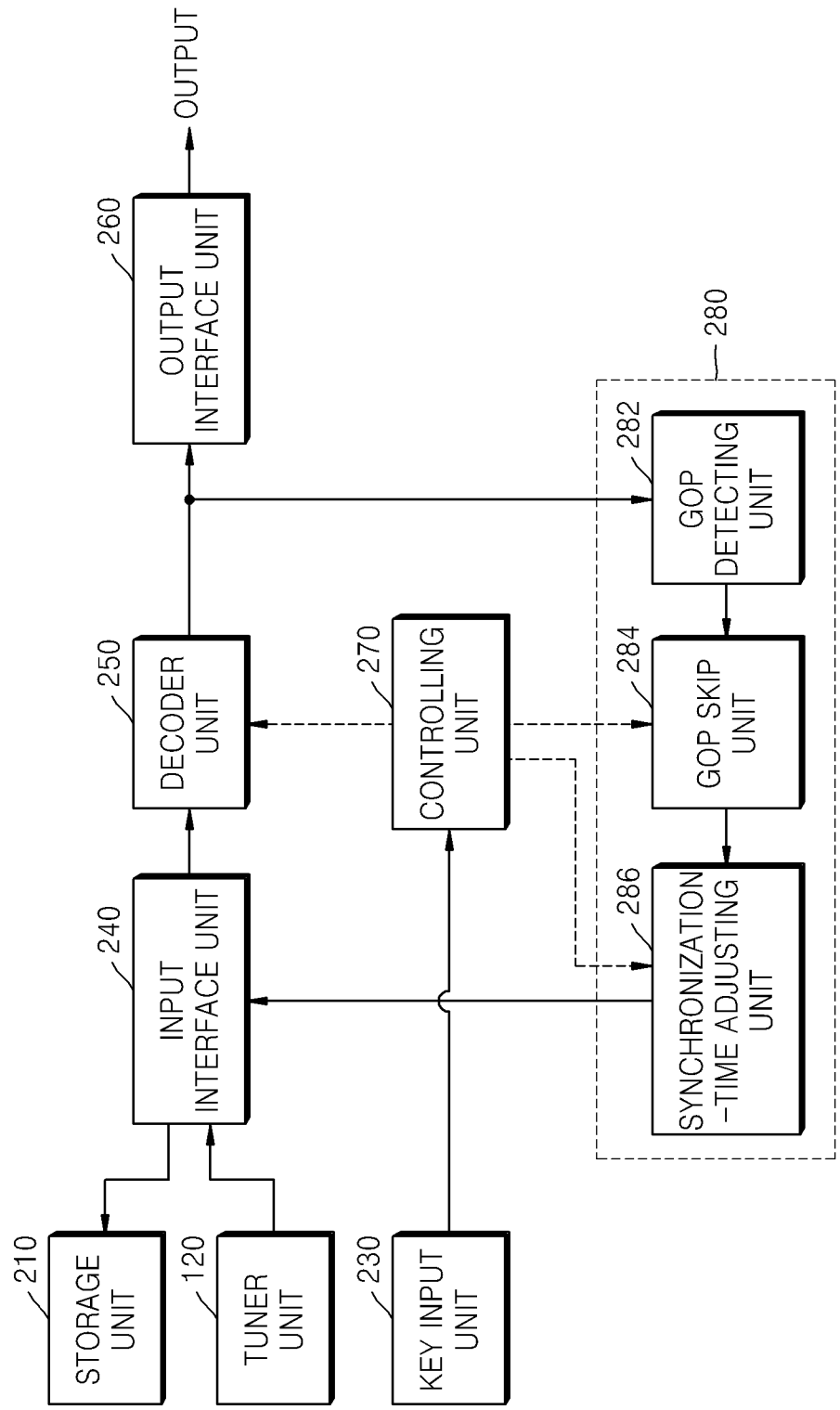
FIG. 2 is a block diagram of an adaptive recording apparatus according to an embodiment of the present general inventive concept.

FIG. 2 is a block diagram of an adaptive recording apparatus according to an embodiment of the present general inventive concept.

Referring to FIG. 2, the adaptive recording apparatus includes a storage unit 210, a tuner unit 120, a key input unit 230, an input interface unit 240, a decoder unit 250, an output interface unit 260, a controlling unit 270, and a recording signal processing unit 280. The recording signal processing unit 280 includes a GOP detecting unit 282, a GOP skip unit 284, and a synchronization-time adjusting unit 286.

The storage unit 210 is composed of a hard disk drive (HDD), a flash memory or the like, and stores media content data configured according to the type of stream, which is input from the input interface unit 240, in a recording mode.

The tuner unit 120 tunes a signal that is received through an antenna, a cable, a satellite dish, or the like, to a television channel frequency.

The input interface unit 240 may perform an analog-to-digital conversion of the received signal if the received signal is an analog signal, and demodulates the received signal tuned by the tuner unit 120 in a manner opposite to a modulation which would be performed in a transmitter, converts the signal into a digital transport stream, which may or may not be compressed, and outputs the digital signal to be recorded in the recording signal processing unit 280 to the storage unit 210. The digital signal includes, for example, an audio signal, a video signal, other data, or the like.

The decoder unit 250 decodes the transport stream which has been demodulated and possibly converted by the input interface unit 240 and analyses the transport stream with regard to GOPs embedded in the transport stream. For example, referring to FIG. 1, one GOP may include a plurality of PESs. In addition, the GOP is a data block that can be individually reproduced in a video reproduction apparatus.

The key input unit 230 receives a user's command that is input by operation of a selection key on the adaptive recording apparatus (not illustrated) and converts the user's command into a key code corresponding to the user's command. For example, the key input unit 230 receives a user's command regarding recording settings such as a recording rate or a recording type, and outputs the command regarding the recording settings to the controlling unit 270.

The recording signal processing unit 280 selectively skips some of the GOPs that are analyzed by the decoder unit 250, and stores the GOPs, according to the recording settings. Alternatively, the recording signal processing unit 280 may variably or consistently skips some of the GOPs, which are analyzed by the decoder unit 250, and stores the GOPs, according to the recording settings.

Elements included in the recording signal processing unit 280 will now be described.

The GOP detecting unit 282 analyses data embedded in the GOPs. That is, referring to FIG. 1, the GOP detecting unit 282 detects the start and end point of a GOP with reference to information in a PES header. The GOP skip unit 284 determines whether the GOP that is detected by the GOP detecting unit 282 is to be skipped and not recorded, according to a control signal in regard to a recording rate or a recording type, which is set by the controlling unit 270.

The synchronization-time adjusting unit 286 amends information regarding a recording time that is changed due to rearrangement of the GOPs, due to some of the GOPs being skipped by the GOP skip unit 284.

The controlling unit 270 receives the user's command, which is input by the selection key, described above, from the key input unit 230, and controls elements of the recording signal processing unit 280. That is, the controlling unit 270 controls the GOP skip unit 284 and the synchronization-time adjusting unit 286 according to the recording rate/type that is selected by the user and input in the key input unit 230. For example, when a user selects the recording rate to be "2", the controlling unit 270 sets a number of a GOP that is to be skipped to "2".

The output interface unit 260 outputs a signal regarding the GOP decoded by the decoder unit 250 to an external output apparatus or an external signal decoding apparatus (not illustrated).

Figure 3:
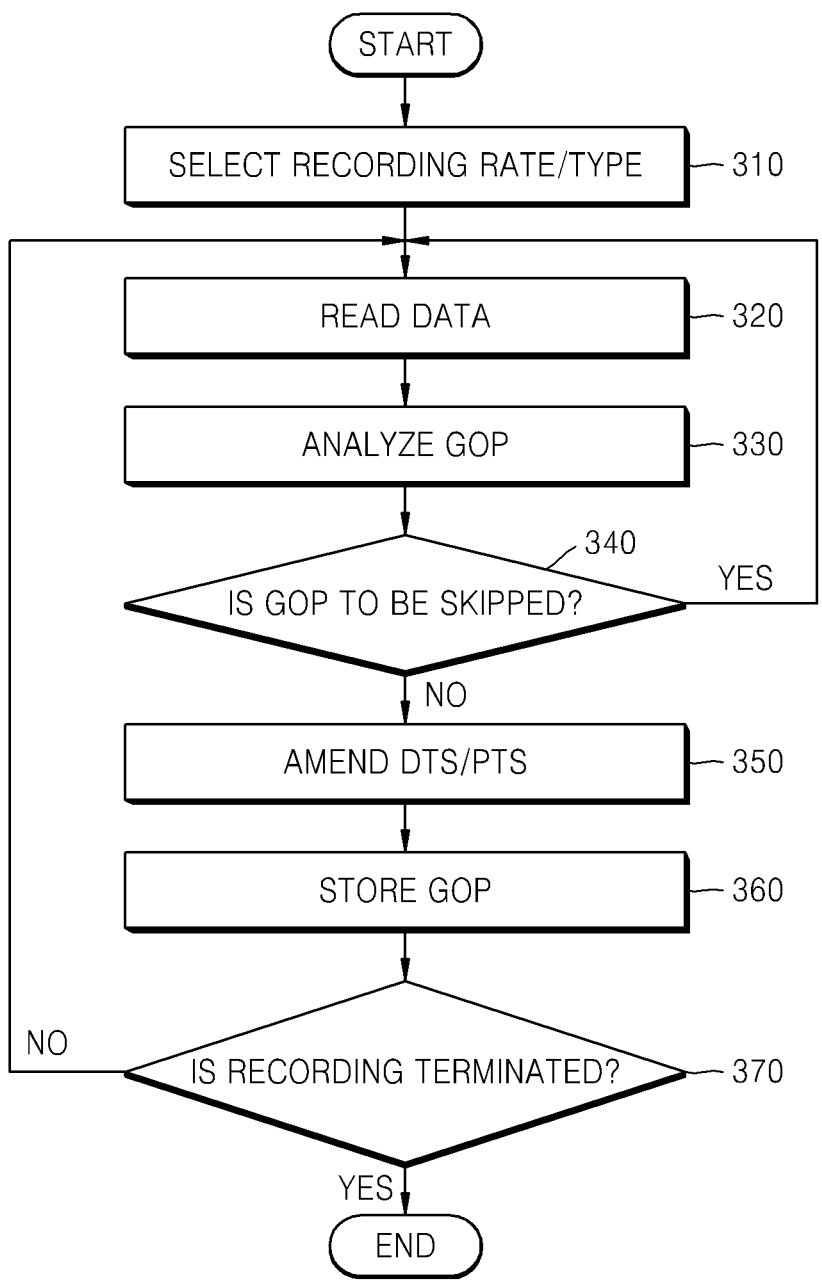
FIG. 3 is a flow chart illustrating an adaptive recording method according to an embodiment of the present general inventive concept.

FIG. 3 is a flow chart illustrating an adaptive recording method according to an embodiment of the present general inventive concept.

First, when recording is started, a recording rate and a recording type, which are set by a user, are selected (operation 310). In this operation, the recording rate is defined as an extent to which a GOP is to be skipped. For example, when the recording rate is 1/N, the extent to which a GOP is to be skipped is an interval defined as "N". In addition, the recording type can be classified into a fixed mode and a variable mode. The fixed mode is a process in which GOPs are skipped at predetermined intervals and stored. The variable mode is a process in which GOPs are variably skipped and stored. The variable mode is reclassified into a recording time based mode and a present time based mode. The recording time based mode is a process in which data is selectively deleted so that data of a recording time is protected and data of a present time, which is remote from the recording time, is deleted first. The present time based mode is a default mode used when a time to finish recording value is not input by a user, and is a process in which previous data is deleted first.

Next, compressed data in the shape of a transport stream is read (operation 320).

Next, the read compressed data is analyzed in GOPs with reference to information regarding a GOP start and end point included in a header (operation 330).

Then, it is determined whether a GOP of the compressed data is to be skipped, based on the set recording rate and type (operation 340). For example, when the recording rate N (i.e., the extent to which a GOP is to be skipped) is "2", GOPs are consistently skipped at two GOPs intervals. When the recording type is the recording time based mode, all GOPs of the recording time are stored, and GOPs of the present time, which is remote from the recording time, are skipped at predetermined intervals.

When a GOP is skipped, compressed data in the shape of a transport stream is again read. On the other hand, when a GOP is not skipped, DTS/PTS information of the GOP is amended, wherein the GOP is stored so as to be reproduced and followed by a GOP that has been previously reproduced (operation 350). The DTS/PTS information is amended by using a method used in conventional decoding technology, and thus the description of the method will be omitted here.

Next, the GOP, whose DTS/PTS information is amended, is stored in a storage medium (operation 360).

Next, it is determined whether recording is terminated with reference to recording information that has been previously set (operation 370). Then, depending on the result of the termination determination, either recording is terminated or compressed data is again read.

Figure 4:
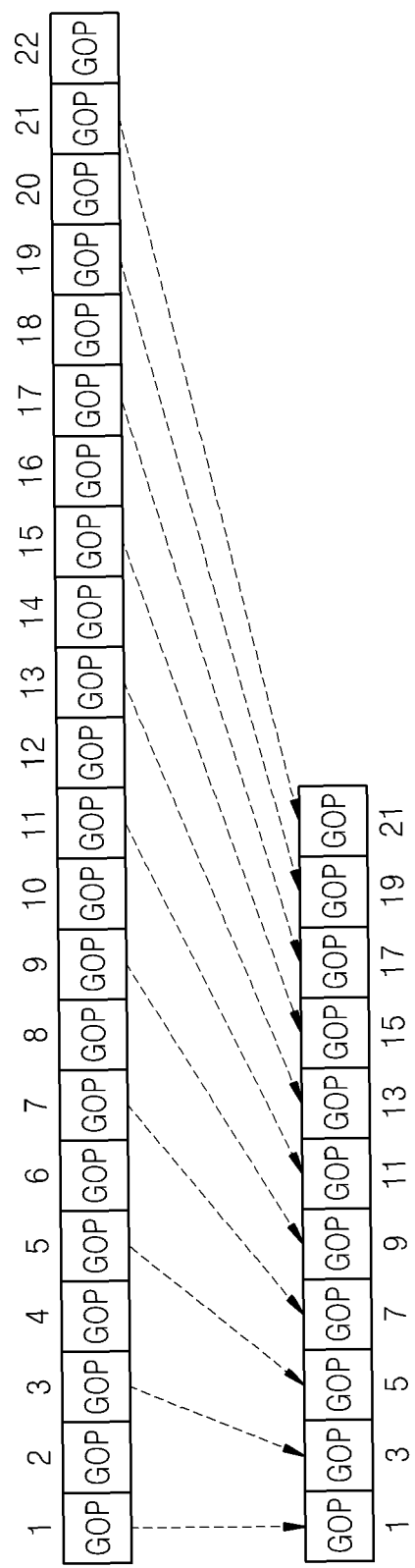
FIG. 4 is a view illustrating a configuration of GOPs in a fixed mode, according to an embodiment of the present general inventive concept.

FIG. 4 is a view illustrating a configuration of GOPs in a fixed mode, according to an embodiment of the present general inventive concept.

Referring to FIG. 4, the GOPs are skipped at predetermined intervals N in the fixed mode, where N=2.

For example, it is assumed that GOPs 1, 2, 3, 4, 5, 6, 7, 8, 9, 10, and 11 through 22 are to be read, and that a recording rate having an interval N is set, where "N=2". In this illustrated example, every other GOP is skipped, that is GOPs are skipped in two GOPs intervals. For example, GOPs 2, 4, 6, 8, and 10 through 22 are skipped, and only GOPs 1, 3, 5, 7, 9, and 11 through 21 are stored. As a result, when the GOPs are skipped at predetermined intervals N, a saving of 1/N of memory capacity can be achieved.

Figure 5:
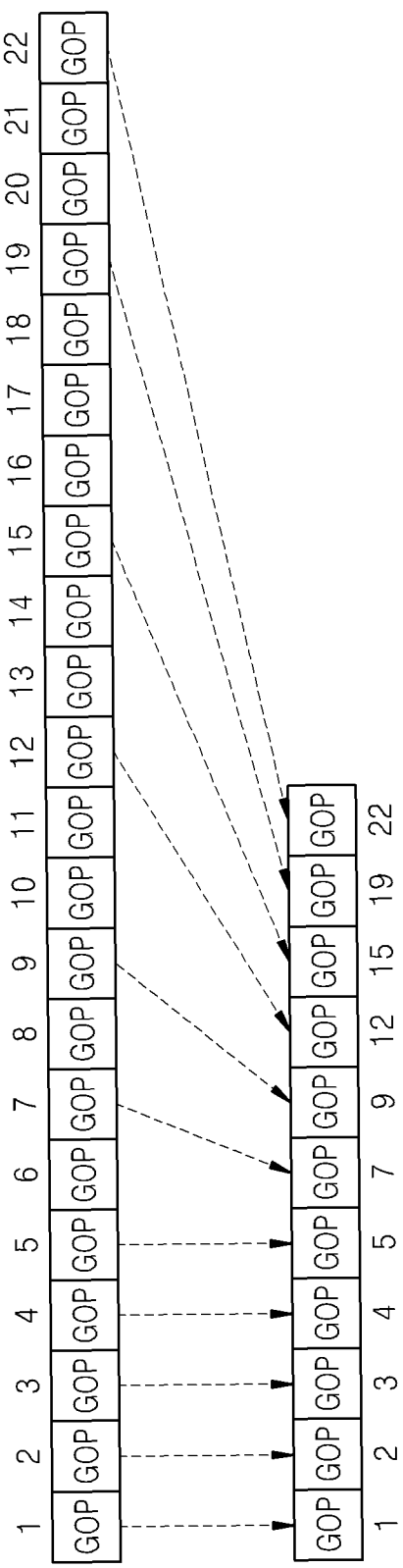
FIG. 5 is a view illustrating a configuration of GOPs in a recording time based mode of a variable mode, according to an embodiment of the present general inventive concept.

FIG. 5 is a view illustrating a configuration of GOPs in a recording time based mode of a variable mode, according to an embodiment of the present general inventive concept.

Referring to FIG. 5, the recording time based mode is used to perform time shift recording (TSR). The recording time is most important in the TSR.

Accordingly, data is selectively deleted so that data of the recording time is protected, and data of a present time, which is remote from the recording time, is deleted first.

For example, referring to FIG. 5, it assumed that GOPs 1, 2, 3, 4, 5, 6, 7, 8, 9, 10, and 11 through 22 are to be read, and that a recording type is set as the recording time based mode. In this example, GOPs 6, 8, 10, 11, 13, 14, 16, 17, 18, 20 and 21 are skipped, and only GOPs 1, 2, 3, 4, 5, 7, 9, 12, 15, 19 and 22 are stored. As a result, the GOPs of the recording time are stored, and the GOPs of the present time, which is remote from the recording time, are skipped first.

Figure 6:
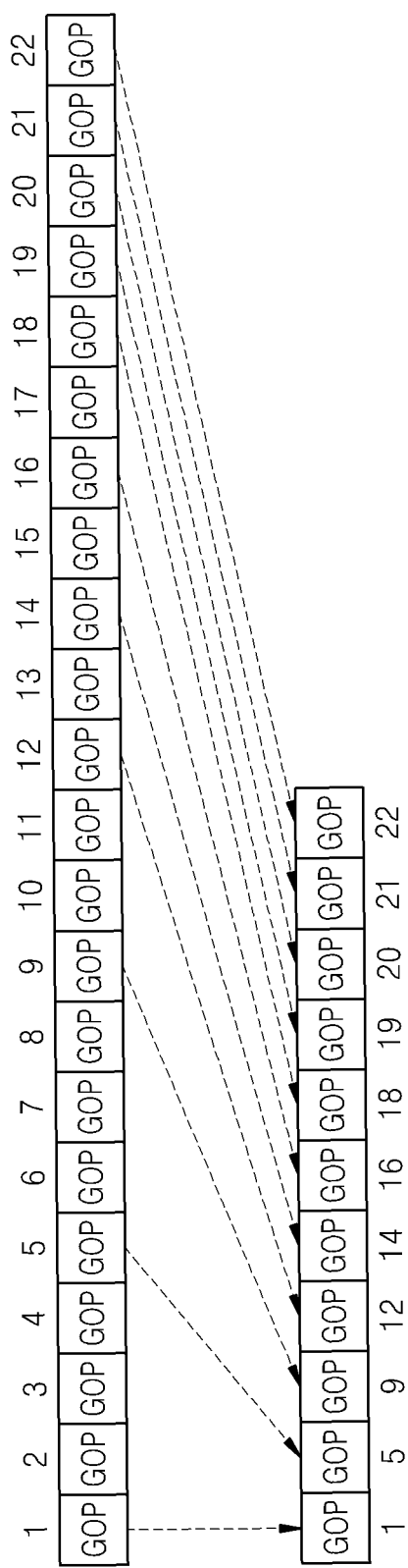
FIG. 6 is a view illustrating a configuration of GOPs of a present time based mode of a variable mode, according to an embodiment of the present general inventive concept.

FIG. 6 is a view illustrating a configuration of GOPs in a present time based mode of a variable mode, according to an embodiment of the present general inventive concept.

Referring to FIG. 6, the present time based mode is used as a default mode when a time to finish recording is not input by a user.

Accordingly, previous data is deleted first since it is not certain when recording is to be terminated in the present time based mode.

For example, referring to FIG. 6, it is assumed that GOPs 1, 2, 3, 4, 5, 6, 7, 8, 9, 10, and 11 through 22 are to be read, and that a recording type is set as the present time based mode. In this case, GOPs 2, 3, 4, 6, 7, 8, 10, 11, 13, 14, 15, and 17 are skipped, and only GOPs 1, 5, 9, 12, 14, 16, 18, 19, 20, 21 and 22 are stored. As a result, the previous GOPs are skipped first, and the GOPs of the present time are stored in the present time based mode.

The present general inventive concept can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, hard disks, floppy disks, flash memories, optical data storage devices. The computer readable recording medium can also be distributed over network coupled computer systems so that the computer readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to the present general inventive concept, GOPs are selectively stored, and thus information regarding many time intervals can be stored in a small storage space without need of an additional encoder, and a TSR time can be expanded in an apparatus having a TSR function, which is restricted by a small storage space.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A recording method, comprising:
    selecting a recording rate and a recording type as recording settings;
    decoding compressed data in units of a plurality of groups of pictures (GOPs) that each include a plurality of consecutive pictures;
    analyzing each GOP of the plurality of GOPs to determine which GOPs of the plurality of GOPs to skip according to the selected recording rate and recording type;
    selectively skipping the GOPs determined to be skipped;
    adjusting a synchronization time of the GOPs that are not skipped and storing the GOPs that are not skipped; and
    storing the adjusted synchronization time information of the GOPs that are stored.

2. The method of claim 1, wherein the recording rate is an interval corresponding to an extent to which GOPs of the plurality of GOPs are to be skipped.

3. The method of claim 1, wherein the recording type is fixed mode recording or variable mode recording.

4. The method of claim 1, wherein GOPs are skipped at predetermined intervals when the recording type is fixed mode recording.

5. The method of claim 1, wherein GOPs of a present time which is remote from a recording time are skipped first when the recording type is a variable mode recording.

6. The method of claim 1, wherein previous GOPs are skipped first when the recording type is a variable mode recording.

7. The method of claim 1, wherein adjusting the information regarding the decoding time comprises:
    amending DTS/PTS information which has changed due to a rearrangement of the GOPs.

8. The method of claim 1, wherein each GOP includes at least one I-picture.

9. The method of claim 8, wherein each GOP includes at least one B-picture and at least one P-picture.

10. A recording method, comprising:
    selecting a recording time and an interval corresponding to an extent to which GOPs of the plurality of GOPs are to be skipped;
    decoding compressed data in units of a plurality of groups of pictures (GOPs) that each include a plurality of consecutive pictures;
    analyzing each GOP of the plurality of GOPs to determine which GOPs of the plurality of GOPs to skip according to the selected recording time and the interval;
    skipping the GOPs determined to be skipped;
    adjusting a synchronization time of the GOPs that are not skipped and storing the GOPs that are not skipped; and
    storing the adjusted synchronization time information of the GOPs that are stored.

11. The method of claim 10, wherein GOPs are consistently skipped at predetermined intervals.

12. The method of claim 10, wherein GOPs of a present time that is remote from a storing time are skipped first.

13. The method of claim 10, wherein previous GOPs are skipped first.

14. A recording apparatus, comprising:
a decoder to decode compressed data in units of a plurality of groups of pictures (GOPs) that each include a plurality of consecutive pictures;
a controller to generate a control signal including control information to set recording settings corresponding to an extent to which GOPs of the plurality of GOPs are to be skipped;
a recording signal processor to analyze each GOP of the plurality of GOPs to determine which GOPs of the plurality of GOPs to skip according to the recording settings set by the controller and to selectively skip the GOPs determined to be skipped, the recording signal processor comprising:
   a GOP detecting unit to detect a GOP start point and end point corresponding to a GOP of the plurality of GOPs; and
   a GOP skip unit to determine whether the GOP detected by the GOP detecting unit is to be skipped, according to the recording settings;
a synchronization-time adjusting unit to amend information regarding a recording time changed due to a rearrangement of GOPs which is performed by the GOP skip unit and to adjust a synchronization time of the GOPs that are not skipped; and
a storage device to store the GOPs that are not skipped by the recording signal processor unit.

15. The apparatus of claim 14, wherein the GOP skip unit comprises:
a fixed mode in which GOPs are skipped at predetermined intervals.

16. The apparatus of claim 14, wherein the GOP skip unit comprises:
a variable mode in which GOPs are variably skipped.

17. The apparatus of claim 16, wherein the variable mode is classified into a recording time based mode in which GOPs of a present time are skipped first, and a present time based mode in which previous GOPs are skipped first.

18. A non-transitory computer readable recording medium having encoded thereon computer instructions that when executed by a computer perform a method of recording digital media content, comprising:
selecting a recording rate and a recording type as recording settings;
decoding compressed data in units of a plurality of groups of pictures (GOPs) that each include a plurality of consecutive pictures;
analyzing each GOP of the plurality of GOPs to determine which GOPs of the plurality of GOPs to skip according to the selected recording rate and recording type;
selectively skipping the GOPs determined to be skipped; and
adjusting a synchronization time of the GOPs that are not skipped and storing the GOPs that are not skipped;
adjusting information regarding a decoding time of the GOPs that are stored; and
storing the adjusted decoding time information of the GOPs that are stored.

* * * * *